UNITED STATES PATENT OFFICE.

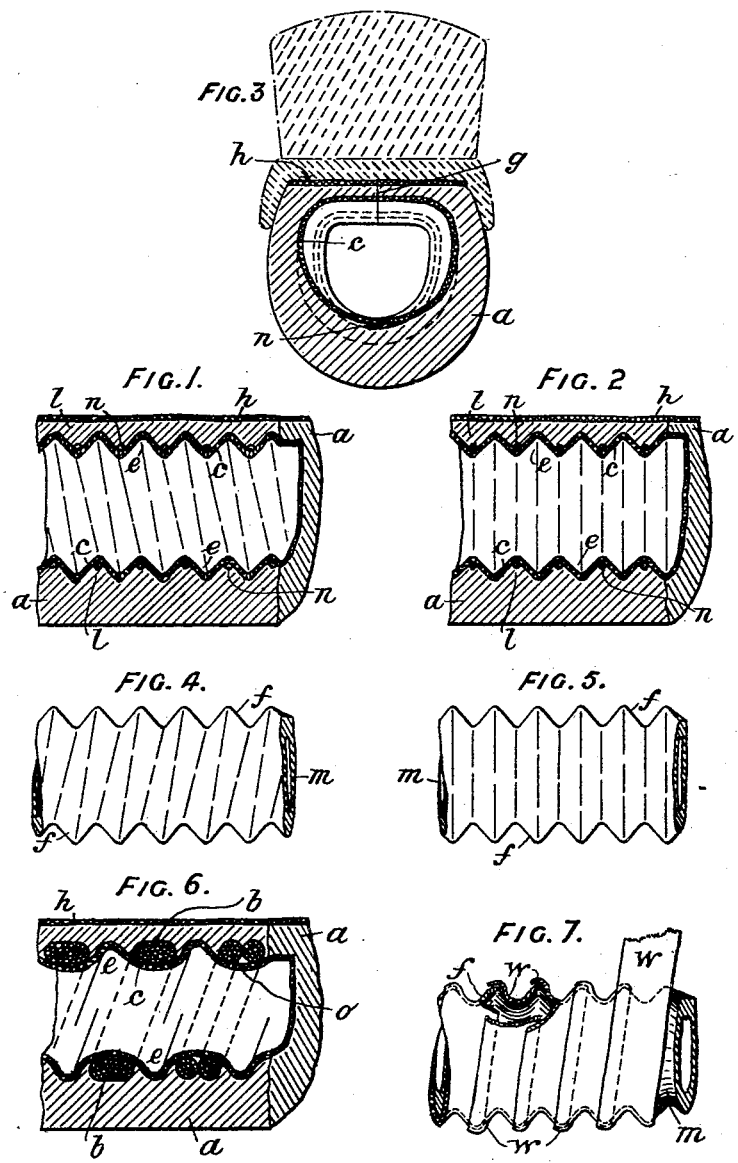

WILLIAM FREDERICK WILLIAMS, OF LONDON, ENGLAND.

ELASTIC TIRE.

SPECIFICATION forming part of Letters Patent No. 684,158, dated October 8, 1901.

Application filed February 21, 1901. Serial No. 48,314. (No model.)

*To all whom it may concern:*

Be it known that I, WILLIAM FREDERICK WILLIAMS, gentleman, a subject of the King of Great Britain, residing at 17 and 18 Great Pulteney street, London, W., England, have invented new and useful Improvements in Elastic Tires, of which the following is a specification.

My invention relates to the manufacture of hollow rubber tires of D or approximately D section adapted to be secured to the wheel-rim by a band passing through the bore of the tire; and the invention has for its object to facilitate the longitudinal compression of the tire, particularly the base portion thereof, when lapping it around the wheel-rim, so as to avoid causing the tread or wearing portion of the tire to be put in tension.

The invention has also for its object (among other incidental advantages) to increase the adhesion of the liner to the bore of the tire. Such tires are usually made in a straight length, and the bore is lined with an adherent layer or layers of canvas, so that when lapped around the circumference of the wheel-rim, the base part of the tire adjacent to the rim being thereby put more or less in compression, the liner tends to become buckled, and by its resistance to such compression tends to cause the tread to be put in tension and stretched in a manner prejudicial to its wearing qualities.

The objects of my invention are attained by forming the walls of the bore of the tire with grooves or corrugations (which may be of half-round, V, or other section) extending in the transverse circumferential direction of the bore, the grooves being either helical convolutions or separate grooves, each lying in one transverse plane.

Reference is to be had to the accompanying drawings, forming part of this specification, wherein—

Figures 1 and 2 are part longitudinal sections of tires, each having a transverse circumferential groove or grooves formed in the wall of the bore, the groove in Fig. 1 being a continuous helix and the grooves in Fig. 2 being separate and each lying in one transverse plane. Fig. 3 is a transverse section of the tire shown in Fig. 1. Figs. 4 and 5 are part side elevations of the mandrels used in the manufacture of the tires shown in Figs. 1 and 2, respectively. Fig. 6 is a view similar to Fig. 1, showing a tire having cord embedded in the rubber, which separates adjacent convolutions of the groove; and Fig. 7 is a part side elevation of a mandrel such as shown in Fig. 4, having wound upon it a slightly-modified form of canvas liner for the bore of the tire.

The same letters of reference indicate the same parts in all the figures.

*a* is the rubber tire, of substantially D-section, the bore of the tire being of D, triangular, or other section and adapted to receive within it a metal band passing longitudinally through the bore, and whereby the base of the tire is bound tightly to its seat in the groove of the wheel-rim.

*c* is the canvas lining, and *e* represents spaced grooves formed in the rubber *a* and in the canvas lining, the grooves being open to the bore of the tire, around which they extend, and being formed either as the convolutions of a continuous helical groove, as shown in Fig. 1, or as separate circumferential grooves in separate transverse planes, as shown in Fig. 2. The grooves *e* may be of V, half-round, or other form in cross-section, with ribs *l*, of rubber, intervening between the grooves, and with the said intermediate ribs there may be combined cords *b*, of fibrous material, embedded or partially embedded in the rubber, the cords extending circumferentially of the bore and being either formed of helical convolutions of a continuous cord or cords or of short separate lengths of cord, according as the grooves are formed by convolutions of a helical groove, as in Fig. 1, or are separate grooves, as in Fig. 2. The cord, whether continuous or in separate short lengths, may be either single, as at *b*, or made up of two or more cords juxtaposed, as at *o*.

The rubber *a* is molded upon a mandrel, Figs. 4 and 5, to the intended form of the tire, preferably by first filling up the spaces between the ribs of the mandrel or between the ribs and cords with plastic rubber and then by extrusion of rubber through a die, through which the mandrel also is passed, the mandrel *m* having formed upon it a continuous helical rib *f*, as in Fig. 4, or separate circumferential ribs *f*, as in Fig. 5. Upon this mandrel is first lapped the strip or strips of rubber-coated canvas of which the lining c is to be formed, the rubber-coated surface being outward. Several strips may be superposed, especially at the sides, and cemented together. The canvas may be made to conform to the ribbed configuration of the mandrel, so as to present internally the desired grooved or corrugated configuration of the bore, by being bound upon the mandrel by string or cord n, whereby the canvas is pressed into the grooves of the mandrel between the ribs thereof. The external corrugations of the canvas may then be filled with plastic rubber, and upon the mandrel thus prepared the rubber a is deposited by extrusion through a die in the usual way of making such tires. The string or cord n may, however, be dispensed with by winding a narrow strip of canvas w helically upon a mandrel m, having a helical rib f, successive convolutions of the strip overlapping, and the convolutions of the strip following those of the rib, as shown in Fig. 7, so that the tensile strain put upon the canvas in winding will cause the strip to conform to the corrugations of the mandrel without the use of string.

The string or cord n, if used, may serve merely to bind the lining c upon the mandrel, as indicated in Figs. 1 and 2, or the cord may be of such diameter as to materially add to the strength of the tire. The kind of cord adapted to fulfil this purpose is preferably a stout plaited cord, or it may be a twisted cord or thin rope. Such cords are shown at b in Fig. 6.

The removal of the mandrel from the tire may be effected after vulcanization of the tire thereon by slitting the base of the tire longitudinally along its center line, as at g, Fig. 3, the parts of the base being either reunited or not after the removal of the mandrel by a covering strip or strips of rubber-coated canvas h, cemented to the base.

It is to be understood that the invention is applicable to tires whether intended to be incased in a removable outer jacket or not.

I claim—

1. A hollow rubber wheel-tire made of a straight length of tube divided longitudinally at the inner circumference or base of the tire in the median plane thereof and having molded in the wall of the bore toward said inner circumference or base transversely-extending grooves so that when the base of the tire is put into longitudinal compression by the bending of the tire to the circular form of the wheel-rim the buckling of the base of the tire will be prevented.

2. A hollow rubber wheel-tire made of a straight length of tube divided longitudinally at the inner circumference or base of the tire in the median plane thereof and having molded in the wall of the bore toward said inner circumference or base corrugations formed by a helically-disposed groove or grooves and intervening rib or ribs, so that when the base of the tire is put into longitudinal compression by the bending of the tire to the circular form of the wheel-rim the buckling of the base of the tire will be prevented.

3. A hollow rubber wheel-tire made of a straight length of tube and having molded in the inner wall of the tire corrugations extending in the transverse circumferential direction of the bore of the tire, in combination with a canvas liner conforming to the corrugated configuration of the rubber and adherent thereto, as described.

4. A hollow rubber wheel-tire having molded in the inner wall of the tire, corrugations extending in the transverse circumferential direction of the bore of the tire, in combination with a cord or cords embedded in the rubber so as to form the salient ribs intervening between the grooves of the corrugations, substantially as specified.

5. A hollow rubber wheel-tire having molded in the inner wall of the tire, corrugations extending in the transverse circumferential direction of the bore of the tire, in combination with a cord or cords embedded in the rubber so as to form the salient ribs intervening between the grooves of the corrugations, and a canvas liner conforming to the corrugated configuration of the bore of the tire and adherent thereto, as described.

WILLIAM FREDERICK WILLIAMS.

Witnesses:
C. G. CLARK,
T. W. KENNARD.